(12) United States Patent
Yu et al.

(10) Patent No.: US 12,335,242 B2
(45) Date of Patent: Jun. 17, 2025

(54) INTERFACE DATA TRANSMISSION METHOD AND APPARATUS, ELECTRONIC DEVICE, AND STORAGE MEDIUM

(71) Applicant: Shenzhen National Engineering Laboratory of Digital Television Co., Ltd., Shenzhen (CN)

(72) Inventors: Xiaolong Yu, Shenzhen (CN); Xinguo Li, Shenzhen (CN); Lin Chang, Shenzhen (CN); Yujie Wu, Shenzhen (CN); Linyu Xu, Shenzhen (CN); Jun Gong, Shenzhen (CN)

(73) Assignee: Shenzhen National Engineering Laboratory of Digital Television Co., Ltd., Shenzhen (CN)

( * ) Notice: Subject to any disclaimer, the term of this patent is extended or adjusted under 35 U.S.C. 154(b) by 154 days.

(21) Appl. No.: 18/034,884

(22) PCT Filed: Aug. 18, 2021

(86) PCT No.: PCT/CN2021/113201
§ 371 (c)(1),
(2) Date: May 1, 2023

(87) PCT Pub. No.: WO2022/127164
PCT Pub. Date: Jun. 23, 2022

(65) Prior Publication Data
US 2023/0421541 A1    Dec. 28, 2023

(30) Foreign Application Priority Data

Dec. 14, 2020    (CN) .................... 202011465857.2

(51) Int. Cl.
*H04L 9/40* (2022.01)
*H04L 9/06* (2006.01)
*H04L 9/08* (2006.01)

(52) U.S. Cl.
CPC ........ *H04L 63/0428* (2013.01); *H04L 9/0643* (2013.01); *H04L 9/0822* (2013.01); *H04L 9/0869* (2013.01); *H04L 63/123* (2013.01)

(58) Field of Classification Search
CPC . H04L 63/0428; H04L 9/0643; H04L 9/0822; H04L 9/0869; H04L 63/123
(Continued)

(56) References Cited

U.S. PATENT DOCUMENTS 7,940,935 B2 * 5/2011 Nakahara ........... G06Q 20/3829
380/278
8,675,872 B2 * 3/2014 Card, II ............. H04N 21/4623
380/279
(Continued)

FOREIGN PATENT DOCUMENTS

CN    1378382    11/2002
CN    103210658    7/2013
(Continued)

OTHER PUBLICATIONS

Extended European Search Report dated Mar. 1, 2024, in European Patent Application No. 21905097.8, 7 pages.
(Continued)

*Primary Examiner* — Amare F Tabor
(74) *Attorney, Agent, or Firm* — Lowe Graham Jones PLLC

(57) ABSTRACT

An interface data transmission method and apparatus, an electronic device and a storage medium are disclosed. The interface data transmission method includes: acquiring a target content stream and a content stream key corresponding to the target content stream; encrypting the target content stream according to the content stream key to obtain encrypted stream ciphertext; acquiring content control information and a shared key of a decryption terminal, and (Continued)

encrypting the content stream key and the content control information according to the shared key to generate a content control information list; embedding the content control information list into the encrypted stream ciphertext to generate encrypted content stream data; and sending the encrypted content stream data to the decryption terminal.

11 Claims, 6 Drawing Sheets

(58) Field of Classification Search
USPC .......................................................... 713/168
See application file for complete search history.

(56) References Cited

U.S. PATENT DOCUMENTS

| | | | |
|---|---|---|---|
| 11,343,085 B2* | 5/2022 | Irazabal | .................. H04L 9/085 |
| 2004/0093494 A1 | 5/2004 | Nishimoto et al. | |
| 2006/0039565 A1 | 2/2006 | Kim et al. | |
| 2007/0153315 A1* | 7/2007 | Saeki | ................. H04N 21/8355 |
| | | | 358/1.14 |
| 2008/0298580 A1 | 12/2008 | Suu et al. | |
| 2009/0136028 A1 | 5/2009 | Card, II | |
| 2009/0219932 A1* | 9/2009 | Kobayashi | .............. H04L 65/65 |
| | | | 370/389 |
| 2013/0061048 A1* | 3/2013 | Suu | ..................... H04L 63/0428 |
| | | | 713/165 |
| 2013/0177154 A1 | 7/2013 | Hill-Jowett | |
| 2017/0019249 A1 | 1/2017 | Kobayashi et al. | |

FOREIGN PATENT DOCUMENTS

| | | |
|---|---|---|
| CN | 103546767 | 1/2014 |
| CN | 106537837 | 3/2017 |
| CN | 112511299 | 3/2021 |
| EP | 1770576 | 4/2007 |
| EP | 1826984 | 8/2007 |
| EP | 1975844 | 10/2008 |

OTHER PUBLICATIONS

International Search Report and Written Opinion of the International Searching Authority (+ English translation), dated Nov. 10, 2021, in International Patent Application No. PCT/CN2021/113201, 11 pages.

First Office Action dated Nov. 28, 2022 (+ English translation), in Chinese Patent Application No. 202011465857.2, 20 pages.

Second Office Action dated Feb. 21, 2023 (+ English translation), in Chinese Patent Application No. 202011465857.2, 20 pages.

* cited by examiner

INTERFACE DATA TRANSMISSION METHOD AND APPARATUS, ELECTRONIC DEVICE, AND STORAGE MEDIUM

PRIORITY CLAIM

This application is a U.S. national phase of International Patent Application No. PCT/CN2021/113201 filed Aug. 18, 2021; which claims priority from Chinese Patent Application No. 202011465857.2 filed Dec. 14, 2020, the contents of which are incorporated herein by reference.

FIELD OF THE INVENTION

The disclosure relates to the technical field of digital televisions, in particular to an interface data transmission method and apparatus, an electronic device, and a storage medium.

BACKGROUND OF THE INVENTION

At present, typical digital interfaces include HDMI, DP, DVI, IEEE1394, Miracast, etc. The main interface data transmission standard is international High-bandwidth Digital Content Protection (HDCP). When the data content protected by HDCP is output, a graphics card will be first verified by a Certified Output Protection Protocol (COPP) driver in an operating system, and only a legal graphics card can implement content output. Then a key of a display device needs to be authenticated, and only a device that meets the requirements of HDCP can finally display the content transmitted by the graphics card.

At present, when implementing data transmission, HDCP needs an additional auxiliary channel for implementing key transmission, and needs a separate authentication process (management instruction and topology information transfer) when there is an interface repeater (HDCP repeater). Moreover, when multiple streams are transmitted in an encryption way, HDCP does not distinguish between the streams, which seriously affects the transmission efficiency.

SUMMARY OF THE INVENTION

The disclosure aims at solving at least one of the technical problems in the existing technology. Therefore, an embodiment of the disclosure provides an interface data transmission method by means of which multi-stream transmission of interface data can be flexibly managed, the time consumed can be reduced, and high fault tolerance can be achieved.

An embodiment of the disclosure further provides another interface data transmission method.

An embodiment of the disclosure provides an interface data transmission apparatus.

An embodiment of the disclosure further provides another interface data transmission apparatus.

An embodiment of the disclosure further provides an electronic device.

An embodiment of the disclosure further provides a computer-readable storage medium.

The interface data transmission method according to an embodiment in a first aspect of the disclosure includes:
acquiring a target content stream and a content stream key corresponding to the target content stream;
encrypting the target content stream according to the content stream key to obtain encrypted stream ciphertext;
acquiring content control information and a shared key of a decryption terminal, and encrypting the content stream key and the content control information according to the shared key to generate a content control information list;
embedding the content control information list into the encrypted stream ciphertext to generate encrypted content stream data; and
sending the encrypted content stream data to the decryption terminal.

The interface data transmission method according to the embodiment in the first aspect of the disclosure has at least the following beneficial effects. By acquiring a target content stream and a content stream key corresponding to the target content stream, and encrypting the target content stream according to the content stream key to obtain encrypted stream ciphertext; acquiring content control information and a shared key of a decryption terminal, and encrypting the content stream key and the content control information according to the shared key to generate a content control information list; embedding the content control information list into the encrypted stream ciphertext to generate encrypted content stream data; and sending the encrypted content stream data to the decryption terminal, multi-stream transmission of interface data can be flexibly managed, the time consumed can be reduced, and high fault tolerance can be achieved.

According to some embodiments of the disclosure, the acquiring content control information and a shared key of a decryption terminal, and encrypting the content stream key and the content control information according to the shared key to generate a content control information list includes: acquiring content control information of the decryption terminal; extracting a decryption identifier of the decryption terminal from the content control information; obtaining the shared key according to the decryption identifier, and encrypting the content stream key according to the shared key; and generating the content control information list according to the shared key, the encrypted content stream key and the content control information.

According to some embodiments of the disclosure, the embedding the content control information list into the encrypted stream ciphertext to generate encrypted content stream data includes: defining an initial infoFrame; filling the content control information list into the initial infoFrame to obtain a target infoFrame; and embedding the target infoFrame into the encrypted stream ciphertext to generate the encrypted content stream data.

According to some embodiments of the disclosure, the method further includes: inserting the content control information list into a preset link to obtain a target link; and embedding the encrypted stream ciphertext into the target link to generate the encrypted content stream data.

The interface data transmission method according to an embodiment in a second aspect of the disclosure includes:
acquiring encrypted content stream data sent by an encryption terminal, the encrypted content stream data including a content control information list and encrypted stream ciphertext;
extracting content control information and a content stream key in the content control information list from the encrypted content stream data;
parsing the content control information and the content stream key by means of the shared key, and verifying integrity to obtain a first verification result;

performing verification according to the content control information to obtain a second verification result in response to the first verification result indicating that verification passes; and storing the content control information based on the second verification result, and decrypting the encrypted stream ciphertext according to the content control information.

The interface data transmission method according to the embodiment in the second aspect of the disclosure has at least the following beneficial effects. By acquiring encrypted content stream data sent by an encryption terminal, the encrypted content stream data including a content stream key, content control information in a content control information list and encrypted stream ciphertext; extracting the content control information and the content stream key in the content control information list from the encrypted content stream data, parsing the content control information and the content stream key by means of the shared key, and verifying integrity to obtain a first verification result; performing verification according to the content control information to obtain a second verification result in response to the first verification result indicating that verification passes; and storing the content control information based on the second verification result, and decrypting the encrypted stream ciphertext according to the content control information, multi-stream transmission of interface data can be flexibly managed, the time consumed can be reduced, and high fault tolerance can be achieved.

According to some embodiments of the disclosure, the storing the content control information based on the second verification result, and decrypting the encrypted stream ciphertext according to the content control information includes: storing the content control information in response to the second verification result indicating that verification passes; extracting a preset infoFrame and a preset active pixel from the encrypted stream ciphertext according to the content control information; and decrypting the preset infoFrame and the preset active pixel according to the content stream key.

According to some embodiments of the disclosure, the extracting content control information and a content stream key in the content control information list from the encrypted content stream data includes: demultiplexing a target infoFrame in the encrypted content stream data to obtain the content control information list; and extracting the content control information and the content stream key from the content control information list.

According to some embodiments of the disclosure, the method further includes: identifying control link symbols from a target link in the encrypted content stream data; and parsing the control link symbols to obtain the content control information list, and extracting the content control information and the content stream key from the content control information list.

The interface data transmission method according to an embodiment in a third aspect of the disclosure, applied to an encryption terminal and a decryption terminal includes:

performing, by the encryption terminal, the interface data transmission method according to the embodiment in the first aspect of the disclosure; correspondingly, performing, by the decryption terminal, the interface data transmission method according to the embodiment in the second aspect of the disclosure.

The interface data transmission method according to the embodiment in the third aspect of the disclosure has at least the following beneficial effects. By performing the interface data transmission method according to the embodiment in the first aspect of the disclosure by the encryption terminal, and by performing the interface data transmission method according to the embodiment in the second aspect of the disclosure by the decryption terminal, multi-stream transmission of interface data can be flexibly managed, the time consumed can be reduced, and high fault tolerance can be achieved.

The interface data transmission apparatus according to an embodiment in a fourth aspect of the disclosure includes:

an acquisition module configured to acquire a target content stream and a content stream key corresponding to the target content stream;

a first encryption module configured to encrypt the target content stream according to the content stream key to obtain encrypted stream ciphertext;

a second encryption module configured to acquire content control information and a shared key of a decryption terminal, and encrypt the content stream key and the content control information according to the shared key to generate a content control information list;

a multiplexing module configured to embed the content control information list into the encrypted stream ciphertext to generate encrypted content stream data; and a sending module configured to send the encrypted content stream data to the decryption terminal.

The interface data transmission apparatus according to the embodiment in the fourth aspect of the disclosure has at least the following beneficial effects. By performing the interface data transmission method according to the embodiment in the first aspect of the disclosure, multi-stream transmission of interface data can be flexibly managed, the time consumed can be reduced, and high fault tolerance can be achieved.

The interface data transmission apparatus according to an embodiment in a fifth aspect of the disclosure includes:

a receiving module configured to acquire encrypted content stream data sent by an encryption terminal, the encrypted content stream data comprising a content control information list and encrypted stream ciphertext;

an extraction module configured to extract content control information and a content stream key in the content control information list from the encrypted content stream data;

a first verification module configured to parse the content control information and the content stream key by means of the shared key, and verify integrity to obtain a first verification result;

a second verification module configured to perform verification according to the content control information to obtain a second verification result in response to the first verification result indicating that verification passes; and a decryption module configured to store the content control information based on the second verification result, and decrypt the encrypted stream ciphertext according to the content control information.

The interface data transmission apparatus according to the embodiment in the fifth aspect of the disclosure has at least the following beneficial effects. By performing the interface data transmission method according to the embodiment in the second aspect of the disclosure, multi-stream transmission of interface data can be flexibly managed, the time consumed can be reduced, and high fault tolerance can be achieved.

The electronic device provided according to a sixth aspect of the disclosure includes: a memory, a processor and a computer program stored in the memory and runnable on the processor, where when executing the program, the processor implements: the interface data transmission method according to the embodiment in the first aspect of the disclosure, or the interface data transmission method according to the embodiment in the second aspect of the disclosure, or the interface data transmission method according to the embodiment in the third aspect of the disclosure.

The electronic device provided according to the sixth aspect of the disclosure has at least the following beneficial effects. By performing the interface data transmission method according to the embodiment in the first aspect by the encryption terminal, and by performing the interface data transmission method according to the embodiment in the second aspect by the decryption terminal, multi-stream transmission of interface data can be flexibly managed, the time consumed can be reduced, and high fault tolerance can be achieved.

The computer-readable storage medium provided according to a seventh aspect of the disclosure stores computer-executable instructions, where the computer-executable instructions are used to: perform the interface data transmission method according to the embodiment in the first aspect of the disclosure; or, perform the interface data transmission method according to the embodiment in the second aspect of the disclosure; or, perform the interface data transmission method according to the embodiment in the third aspect of the disclosure.

The computer-readable storage medium provided according to the seventh aspect of the disclosure has at least the following beneficial effects. By performing the interface data transmission method according to the embodiment in the first aspect by the encryption terminal, and by performing the interface data transmission method according to the embodiment in the second aspect by the decryption terminal, multi-stream transmission of interface data can be flexibly managed, the time consumed can be reduced, and high fault tolerance can be achieved.

Additional aspects and advantages of the disclosure will be set forth in part from the following description, and in part will be apparent from the following description, or may be learned by practice of the disclosure.

BRIEF DESCRIPTION OF THE DRAWINGS

Preferred and alternative examples of the present invention are described in detail below with reference to the following drawings.

Furthermore, the above-mentioned and/or additional aspects and advantages of the disclosure will be apparent and easy to understand from the description of embodiments with reference to the following drawings, in which.

REFERENCE NUMERALS

Figure 1:
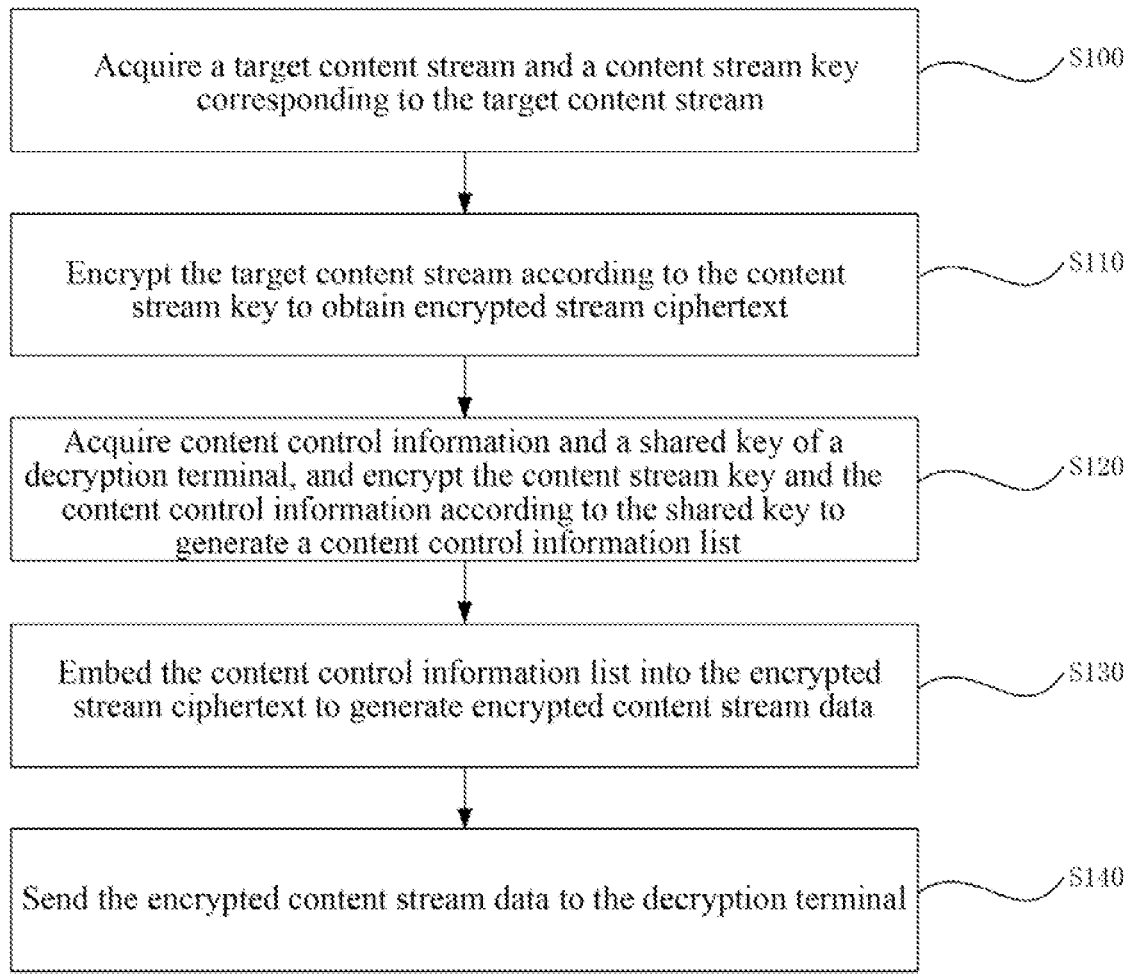
FIG. 1 is a flowchart of an interface data transmission method according to an embodiment of the disclosure.

Acquisition module 500, first encryption module 510, second encryption module 520, multiplexing module 530, sending module 540, receiving module 600, extraction module 610, first verification module 620, second verification module 630, decryption module 640, processor 700, memory 710, data transmission module 720, camera 730, display screen 740.

DETAILED DESCRIPTION OF THE PREFERRED EMBODIMENT

Description will be made in detail to the embodiments of the disclosure, examples of which are illustrated in the accompanying drawings. The reference numerals which are the same or similar throughout the accompanying drawings represent the same or similar components or components with the same or similar functions. The embodiments described below with reference to the accompanying drawings are exemplary, and are intended to explain the disclosure, rather than being construed as limitations to the disclosure.

In the description of the disclosure, unless otherwise defined clearly, terms such as "arrangement", "installation," and "connection" shall be understood in a broad sense. For those having ordinary skill in the art, the specific meanings of the above terms in the disclosure may be reasonably determined in combination with the specific content of the technical schemes.

First of all, some terms involved in the disclosure are explained:

1. AES: AES stands for Advanced Encryption Standard, which is a common symmetric encryption algorithm, where AES-128-CTR algorithm is to implement the process of encrypting 16-byte (128-bit) data.
2. CTR: CTR is a stream cipher that generates a key stream by encrypting a counter that accumulates one by one. In CTR, each packet corresponds to a counter that accumulates one by one, and the key stream is generated by encrypting the counter.
3. DP1.4: DP1.4 is the latest DP standard issued by Video Electronics Standards Association (VESA) in February 2015, has a bandwidth of 32.4 Gbps, and supports 4K 120 Hz and 8K 30 Hz.
4. HMAC value: the full name of HMAC is Hash-based Message Authentication Code.
5. CTA-861-G: CTA-861-G (formerly EIA/CEA-861) is formulated by CTA whose full name is Consumer Technology Association.
6. Hash: Hash refers to Hash algorithm, which transforms input (also known as pre-image) of arbitrary length into output of fixed length through Hashing, the output being a Hash value.
7. HMAC: HMAC stands for Hash-based Message Authentication Code. In HMAC operation, a message digest is generated as output by taking a key and a message as input by means of the Hash algorithm.
8. CMAC: CMAC stands for Cipher-based Message Authentication Code, which like HMAC, requires a key to encrypt content to obtain MAC, and is generally used as the signature of a message.

At present, when implementing data transmission, HDCP needs an additional auxiliary channel for implementing key transmission, and needs a separate authentication process (management instruction and topology information transfer) when there is an interface repeater (HDCP repeater). Moreover, when multiple streams are transmitted in an encryption way, HDCP does not distinguish between the streams, which seriously affects the transmission efficiency.

On this basis, embodiments of the disclosure provide an interface data transmission method and apparatus, an electronic device, and a storage medium by means of which multi-stream transmission of interface data can be flexibly managed, data transmission can be implemented without the aid of auxiliary channels, the time consumed can be reduced, and high fault tolerance can be achieved.

Referring to FIG. 1, an interface data transmission method according to an embodiment in a first aspect, includes the following steps of S100 to S140.

In S100, a target content stream and a content stream key corresponding to the target content stream are acquired.

The target content stream may be an audio-video data stream that needs to be encrypted, the audio-video data stream may or may not be compressed through coding. The content stream key may be an encryption key of the target content stream. Optionally, the encryption range of target content stream data may include the encryption of effective pixels in a video frame format, and may also include the encryption of data of specified infoFrames in the video frame format. The encryption range of the target content stream data may specify a currently processed video frame, and may also specify a subsequent video frame. When an encryption terminal needs to send the target content stream to one or more decryption terminals, a process performed by the encryption terminal may be started. Specifically, a content stream key Kc stream and an initial value IV of a target content may be randomly generated. For example, for the AES-128-CTR algorithm, the content stream key is a 128-bit random number, and the initial value IV is a 64-bit random number.

In S110, the target content stream is encrypted according to the content stream key to obtain encrypted stream ciphertext.

The encrypted stream ciphertext may be data obtained by encrypting the target content by means of the content stream key. Optionally, the encrypted stream ciphertext may be formed by encrypting the target content by means of the content stream key. For example, assuming that the content stream key includes a content stream key Kc and an initial value IV, a preset infoFrame and a preset active pixel area in the target content stream may be encrypted according to the content stream key Kc and the initial value IV, the preset infoFrame and the preset active pixel area may be obtained through negotiation between an encryption terminal and a decryption terminal, and thus a key pipeline can be prepared according to the content stream key Kc and the initial value IV, that is, the target content stream may be circularly encrypted in a pipeline way to obtain encrypted stream ciphertext.

In S120, content control information and a shared key of a decryption terminal are acquired, and the content stream key and the content control information are encrypted according to the shared key to generate a content control information list.

The content control list may consist of several content control information, the content control information may include management instructions and an indicated encryption area, the management instructions may include requirements of version, security level, number of times of decryption of the decryption terminal, and the indicated encryption area may be a range that marks the decryption of data in the encrypted stream ciphertext. The content control information list may be a list consisting of key and content control information such as the number of times the data stream of one or more decryption terminals is decrypted (Depth), the security level (SecurityLevel) of the decryption terminal, the version (Version) of the decryption terminal, etc. The shared key may be a shared key of the encryption terminal and the decryption terminal, which may come from the authentication negotiation between the encryption terminal and the decryption terminal. Optionally, in order to realize the authorization control of the encryption terminal and judge whether one or more decryption terminals meet the requirements of licensing instructions, the shared key Ks of the decryption terminal may be retrieved from the decryption terminals meeting the requirements of Depth, SecurityLevel and Version. If there are multiple decryption terminals, the multiple decryption terminals correspond to multiple different Ks, and a Ks list may be formed according to the multiple Ks. If the preparation of a key pipeline is not completed, wait until the preparation of the key pipeline is completed. If the preparation of the key pipeline is completed, the content stream key Kc and the initial value IV may be AES encrypted according to the Ks list, the content control information may be encrypted according to the Ks list by means of the HMAC-SHA256 algorithm, and then a content control information list Key_CCI_InfoList may be generated.

In S130, the content control information list is embedded into the encrypted stream ciphertext to generate encrypted content stream data.

The encrypted content stream data may be a data stream finally obtained by encryption. Optionally, in order to enhance fault tolerance, the content stream key and the content control information list may be multiplexed for many times. In order to implement multi-stream encrypted transmission, the content control information list may be embedded in the encrypted stream ciphertext to form encrypted content stream data, so that no additional protocol rounds are needed to be executed in the auxiliary channel, and time consumed is reduced. Optionally, the content control information list may be defined as a special infoFrame, and the special infoFrame may be placed in a vertical blanking area in a video format of the encrypted stream ciphertext and before any encrypted infoFrame of the encrypted stream ciphertext. When content stream key generation, content stream key update and other situations occur, it is only necessary to multiplex the special infoFrame in several initial video format frames of the encrypted stream ciphertext, and then the encrypted content stream data may be generated. Alternatively, optionally, the content control information list may be defined as a special packet transmitted through an interface, and the special packet may be marked by an interface link symbol. When content stream key generation, content stream key update and other situations occur, the special packet may be multiplexed by means of an interface link, and then encrypted content stream data may be generated.

In S140, the encrypted content stream data is sent to the decryption terminal.

Optionally, the encrypted content stream data may be sent to the decryption terminal through an interface, so that the decryption terminal can decrypt the encrypted content stream data to implement interface data transmission.

The above-mentioned interface data transmission method has the following beneficial effects. By acquiring a target content stream and a content stream key corresponding to the target content stream, and encrypting the target content stream according to the content stream key to obtain encrypted stream ciphertext; acquiring content control information and a shared key of a decryption terminal, encrypting the content stream key and the content control information according to the shared key to generate a content control information list; embedding the content control information list into the encrypted stream ciphertext to generate encrypted content stream data; and sending the encrypted content stream data to the decryption terminal, multi-stream transmission of interface data can be flexibly managed, the time consumed can be reduced, and high fault tolerance can be achieved.

In some embodiments of the disclosure, the acquiring content control information and a shared key of a decryption terminal, and encrypting the content stream key and the content control information according to the shared key to generate a content control information list includes the following steps.

Acquiring content control information of the decryption terminal, where the content control information may include management instructions and an indicated encryption area, the management instructions may include requirements of Version of the decryption terminal, SecurityLevel of the decryption terminal, Depth, and the indicated encryption area may be a range that marks the decryption of data in the encrypted stream ciphertext. Optionally, the content control information may be extracted from one or more decryption terminals meeting the requirements of Depth to be decrypted, the SecurityLevel of the decryption terminal and the Version of the decryption terminal.

Extracting a decryption identifier of the decryption terminal from the content control information, where the decryption identifier may be a unique identifier (ID) of the decryption terminal meeting the requirements of Depth, SecurityLevel and Version. Optionally, the unique ID of the decryption terminal meeting the requirements of Depth, SecurityLevel and Version may be extracted, and different decryption terminals may correspond to different decryption identifiers. If multiple decryption terminals meet the above requirements, an ID List may be generated according to the IDs of the multiple decryption terminals.

Obtaining the shared key according to the decryption identifier, and encrypting the content stream key according to the shared key. Optionally, assuming that there are multiple decryption terminals, the shared key Ks of the decryption terminals may be checked out through the decryption ID list of the multiple decryption terminals. If multiple decryption terminals meet the requirements, the multiple decryption terminals may correspond to multiple different Ks respectively, a Ks list may be formed according to the multiple different Ks, and then the content stream key Kc and the initial value IV may be AES encrypted through the Ks list. For example, EKs=AES-128-CTR (KS, Kc∥IV), that is, Kc is AES encrypted by means of Ks, where Ks is the shared key of an encryption terminal and a decryption terminal; Kc is the content stream key, and IV is the initial value of content stream encryption. Thus, the encrypted content stream key EKs can be obtained.

Generating the content control information list according to the shared key, the encrypted content stream key and the content control information. Optionally, a content control information list Key_CCI_InfoList may be generated according to the Ks list, the encrypted content stream key EKs and the content control information. For example, the obtained Key_CCI_InfoList is:

Key_CCI_InfoList=CCI∥List{ID_B∥EKs∥ HMAC(Ks, CCI∥ID_B∥EKs)} where List is a list that may contain multiple content control information, EKs=AES-128-CTR(KS, Kc∥IV), Ks is the shared key of the encryption terminal and the decryption terminal, Kc is the content stream key, IV is the initial value of content stream encryption, and ID_B is the decryption identifier of the decryption terminal. HMAC is an HMAC-SHA256 algorithm, and Hash-based Message Authentication Code (HMAC) is a message authentication code (MAC) generated by means of a special calculation method by adopting a cryptographic hash function and combining an encryption key, which is used to protect the integrity of messages;

CCI={Depth, SecurityLevel, Version, FrameNumber∥InfoFrameTypeCodeList∥EncryptArea} where FrameNumber is the serial number of the preset encrypted initial video frame, the serial number of the first processed video frame after inserting the Key_CCI_InfoList may be recorded as 0, and the serial number increases as the number of processed video frames increases, indicating that encryption is started from which video frame after inserting the Key_CCI_InfoList. When FrameNumber is 0, it is indicated that both the current video frame and the subsequent video frame need to be encrypted. InfoFrameTypeCodeList indicates which infoFrames are encrypted in the video format. For example, in the CTA-861-G, an audio infoFrame is defined as InfoFrame Type=0x04. If the InfoFrameTypeCodeList contains 0x04 type, the data of the audio infoFrames are all encrypted. EncryptArea is the horizontal-vertical value of the encrypted active pixel area of the video format frame, such as {{250, 340}, {350,700}}, that is, the active pixel blocks of horizontal 250 to 350 and vertical 340 to 700 are encrypted. The above-mentioned Depth, Securitylevel, and Version are set by preset authority control, and are used to mark that the content stream of the encryption terminal is allowed to be decrypted by the device with what security requirements (that is, the security requirements by the encryption terminal for the decryption terminal). FrameNumber, InfoFrameTypeCodeList, and EncryptArea may all be obtained through negotiation between the encryption terminal and the decryption terminal. Therefore, the content control information list Key_CCI_InfoList may be obtained. A decryption identifier of the decryption terminal is extracted from the content control information; the shared key is obtained from the decryption terminal according to the decryption identifier by checking the decryption terminal, and the content stream key is encrypted according to the shared key to obtain an encrypted content stream key; and the content control information list is generated according to the shared key, the encrypted content stream key and the content control information, so that the content control information list and the content stream key can be transmitted in a binding way. When there is multi-stream transmission, each stream has its own decryption control rule, so that the interface data transmission is more flexible.

In some embodiments of the disclosure, the embedding the content control information list into the encrypted stream ciphertext to generate encrypted content stream data includes the following steps.

Defining an initial infoFrame, where the initial infoFrame may be a special infoFrame defined according to requirements. Optionally, in order to improve the line utilization, for the case where the content control information list is multiplexed by means of the special infoFrame, an initial infoFrame may be defined, and the format is shown in the following Table 1:

TABLE 1

| | |
|---|---|
| Extended InfoFrame Type code (2 bytes) | Type LSB Type MSB |
| Length of Extended InfoFrame (2 bytes) | Length LSB Length MSB |
| Ctr (8 bytes) | ctr value of AES-128-CTR encryption, corresponding to ctr value of the initial packet of the encryption area |
| Data Byte 1 ... Data Byte n | Extended InfoFrame Data Byte 1 ... Extended InfoFrame Data Byte n | where Data byte is a data segment of the initial infoFrame, so that a defined initial infoFrame can be obtained.

Filling the content control information list into the initial infoFrame to obtain a target infoFrame, where the target infoFrame may be an infoFrame obtained by filling the content control information list into the initial infoFrame. Optionally, the content of the content control information list Key_CCI_InfoList may be multiplexed for many times and filled into the data segment (Data byte) of the initial infoFrame, so that a filled target infoFrame can be obtained.

Embedding the target infoFrame into the encrypted stream ciphertext to generate the encrypted content stream data. Optionally, referring to FIG. 2 which is a schematic diagram of multiplexing of a target infoFrame, in conjunction with FIG. 2, it can be seen that FIG. 2 includes an active pixel area (i.e. an active area), a horizontal blanking area and a vertical blanking area, where the target infoFrame may be placed in the vertical blanking area in a video format of the encrypted stream ciphertext and before any encrypted audio infoFrame of the encrypted stream ciphertext. The content control information list Key_CCI_InfoList in the target infoFrame does not need to be multiplexed for all video frames. Generally, when the content stream key Kc is generated, the content stream key Kc is updated, the CCI is generated, and the CCI is updated, it may only multiplex the special infoFrame in several initial video format frames of the encrypted stream ciphertext, and then encrypted content stream data may be generated. By defining an initial infoFrame, filling the content control information list into the initial infoFrame to obtain a target infoFrame, and embedding the target infoFrame into the encrypted stream ciphertext, both the content control information list and the content stream key can be multiplexed in the encrypted content stream data, which does not need extra round time consumption and saves bandwidth consumption.

In some embodiments of the disclosure, the method for generating encrypted content stream data further includes the following steps.

Figures 2, 3:
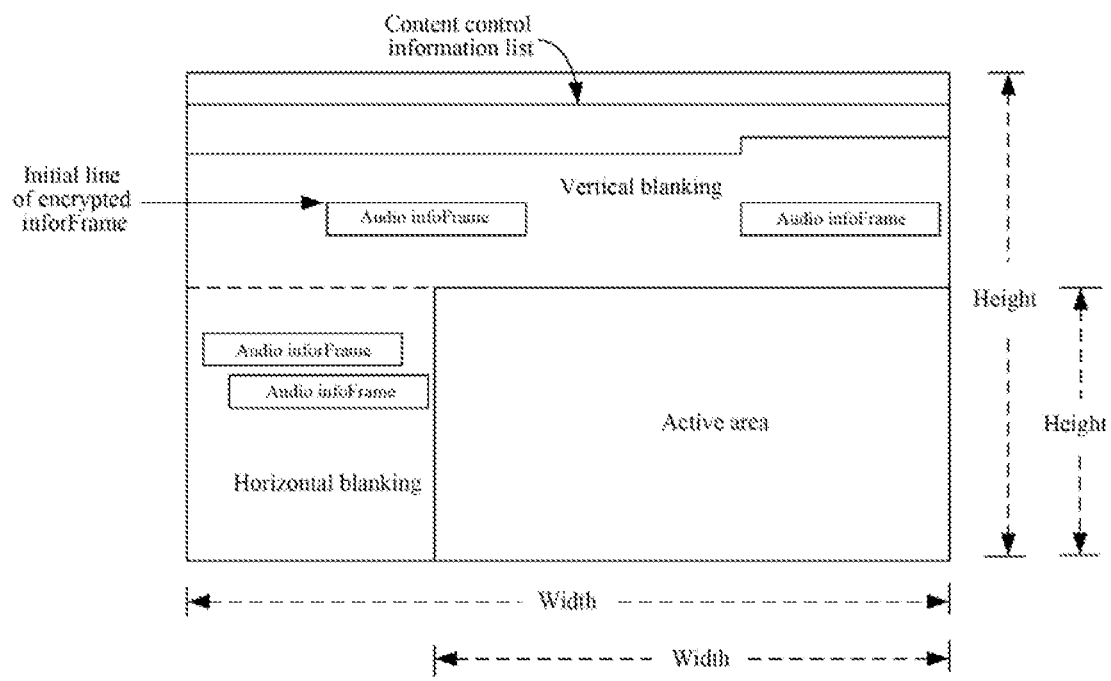
FIG. 2 is a schematic diagram of generating encrypted content stream data according to an embodiment of the disclosure.
FIG. 3 is a schematic diagram of generating encrypted content stream data according to another embodiment of the disclosure.

Inserting the content control information list into a preset link to obtain a target link, where the preset link may include preset Control Link Symbols defined by the interface link layer; and the target link may be a link obtained after inserting the content control information list into the preset link. Optionally, in the case where the content control information list is multiplexed by means of the interface link instead of the infoFrame, the Control Link Symbols defined by the interface link layer may be preset, that is, the preset link may be obtained. The content control information list Key_CCI_InfoList may be inserted into the preset link, referring to FIG. 3 which is a schematic diagram of a non-interleaved transmission content control information list Key_CCI_InfoList of a DP1.4 link 4lan, in conjunction with FIG. 3, it can be seen that the content control information list Key_CCI_InfoList and the packet counter value ctr may be packaged into a data packet and the data packet is inserted between SS and SE in DP1.4, where SS is SDP start, that is, a start symbol mark of a second data packet; and SE is SDP end, that is, an end symbol mark of the second data packet. In addition, BS in FIG. 3 is Blanking Start, that is, a blanking start (link control) symbol mark; BE is Blanking End, that is, a blanking end (link control) symbol mark; VB-ID is Vertical Blanking ID, which is used to mark a transmission status of a content stream, such as the interval of vertical blanking, whether audio is multiplexed, etc.; Mvid is a time stamp value for the video stream, that is, a video timestamp; and Maud is a time stamp value for the audio stream, that is, an audio timestamp. Therefore, a target link is formed.

Embedding the encrypted stream ciphertext into the target link to generate the encrypted content stream data. Optionally, as shown in FIG. 3, the encrypted stream ciphertext may be embedded in an interface link of the target link to form the encrypted content stream data. The content control information list Key_CCI_InfoList in the target link does not need to be multiplexed for all video frames. When the content stream key Kc is generated, the content stream key Kc is updated, the CCI is generated and the CCI is updated, the CCI may be multiplexed and transmitted several times by means of the interface link, and then the encrypted content stream data may be generated. The content control information list is inserted into a preset link to obtain a target link, and then the target link is embedded into the encrypted stream ciphertext to generate the encrypted content stream data, so that the time consumption of protocol rounds can be reduced, and the bandwidth consumption can be saved.

Figure 4:
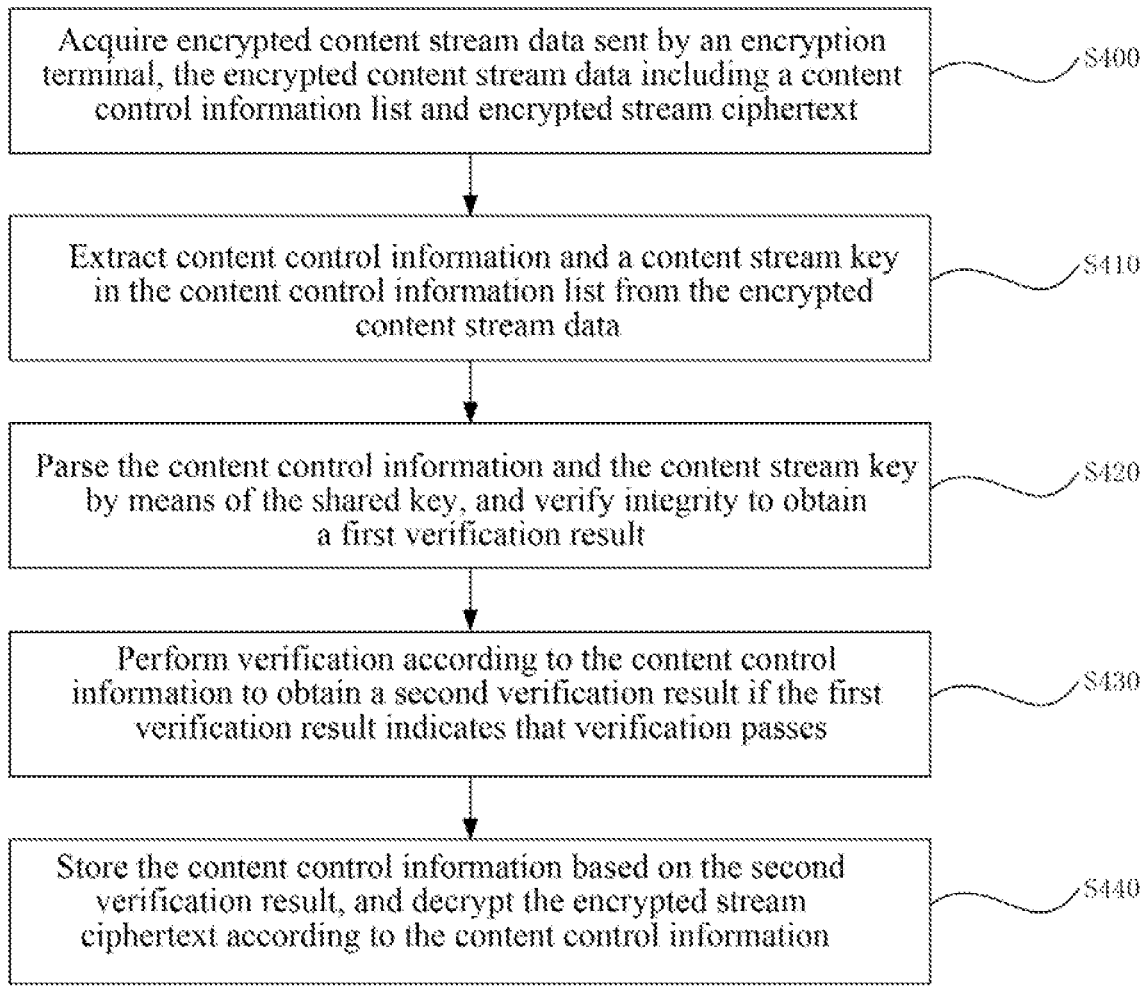
FIG. 4 is a flowchart of an interface data transmission method according to another embodiment of the disclosure.

Referring to FIG. 4, an interface data transmission method according to an embodiment in a second aspect of the disclosure, includes the steps S400 to S440.

In S400, encrypted content stream data sent by an encryption terminal is acquired, the encrypted content stream data comprises a content control information list and encrypted stream ciphertext.

Optionally, after the decryption terminal receives the encrypted content stream data, a decryption process may be started. The decryption terminal may receive the encrypted content stream data from the encryption terminal, the obtained encrypted content stream data includes a content stream key Kc and its initial value IV, a content control information list Key_CCI_InfoList and encrypted stream ciphertext. In some specific embodiments, because the Key_CCI_InfoList does not exist in every video frame, it needs to be re-multiplexed only when the content stream secret key Kc is updated, the CCI is updated, etc. Therefore, if it has already existed in the decryption terminal, it is not necessary to update the CCI and the content stream secret key Kc. It may be checked whether the encrypted content stream data contains the content control information list Key_CCI_InfoList, for example, it may be first checked whether the content stream key Kc exists in the decryption terminal, if Kc does not exist, wait until the key_CCI_Infolist appears in the encrypted content stream data; and if the Key_CCI_InfoList does not exist, but the Kc exists, the encrypted content stream data is directly decrypted.

In S410, content control information and a content stream key in the content control information list are extracted from the encrypted content stream data.

Optionally, if the content control information list Key_CCI_InfoList exists, the encrypted content stream data is demultiplexed to extract the content control information list Key_CCI_InfoList and an encryption counter value ctr, and then some content control information, the content stream key Kc and the initial value IV are obtained from the content control information list. In some specific embodiments, if the encryption terminal adopts target infoFrame multiplexing, a target infoFrame in the encrypted content stream data is demultiplexed to obtain the content control information list Key_CCI_InfoList and the encryption counter value ctr, and then the corresponding content control information of the decryption terminal, the content stream key Kc and the initial value IV are extracted from the content control information list Key_CCI_InfoList; and if the encryption terminal adopts interface link multiplexing, the target link in the encrypted content stream data is identified, the content control information list Key_CCI_InfoList and the encryption counter value ctr are obtained by parsing, and then the corresponding content control information of the decryption terminal, the content stream key Kc and the initial value IV are extracted from the content control information list Key_CCI_InfoList.

In S420, the content control information and the content stream key are parsed by means of the shared key, and integrity is verified to obtain a first verification result.

The first verification result may be a result obtained by verifying the content control information and the content stream key. Optionally, the content control information and the content stream key may be decrypted by means of the shared key. For example, a unique identifier ID_B corresponding to the decryption terminal contained in the encrypted content stream data may be searched for through the shared key Ks. If there is a unique identifier ID_B that is consistent with the decryption terminal, an HMAC value may be verified according to the Hash algorithm or may be verified through the CMAC to verify the integrity of the content control information and the content stream key. The Kc and the IV are decrypted by means of the shared key, and the content control information is extracted, obtaining a first verification result indicating that verification passes. If the content stream key Kc and the IV as well as the content control information consistent with the unique ID_B of the decryption terminal are not found, an error is reported, and the decryption process is exited, obtaining a first verification result indicating that verification fails.

In S430, verification is performed according to the content control information to obtain a second verification result if the first verification result indicates that verification passes.

The second verification result may be a result obtained by verifying whether the content control information is consistent with an attribute of the decryption terminal itself. Optionally, it may be verified whether management instructions in the content control information are consistent with the attribute of the decryption terminal itself, the management instructions includes requirements of Version, SecurityLevel, number of times of decryption of the decryption terminal. Specifically, it may be checked whether the Depth, SecurityLevel and Version of the decryption terminal itself are consistent with those of the decryption terminal in the management instructions, if so, a second verification result indicating that verification passes is obtained; otherwise, the decryption process is exited, and a second verification result indicating that verification fails is obtained. In some specific embodiments, if the Depth, SecurityLevel and Version of the decryption terminal itself are consistent with those of the decryption terminal in the management instructions, a key pipeline may be prepared according to the content stream key Kc, the initial value IV and the encryption counter value ctr, that is, the encrypted content stream may be decrypted circularly in a pipeline way.

In S440, the content control information is stored based on the second verification result, and the encrypted stream ciphertext is decrypted according to the content control information.

Optionally, it may be first checked whether the preparation of a key pipeline is completed, if not, wait until the preparation of the key pipeline is completed; if so, the encrypted stream ciphertext may be extracted from the encrypted stream content data and decrypted according to the second verification result. Specifically, if the second verification result indicates that verification passes, it is indicated that the management instructions in the content control information are consistent with the attribute of the decryption terminal itself, so the decryption terminal may extract the encrypted stream ciphertext and decrypt the encrypted stream ciphertext. The decryption terminal may store the content control information and decrypt the encrypted stream ciphertext according to the management instructions and the indicated encryption area in the content control information. The decryption range of the encrypted stream ciphertext may include the decryption of effective pixels in a video frame format, and may also include the decryption of data of specified infoFrames in the video frame format. The decryption range of the encrypted stream ciphertext can specify a currently processed video frame, and may also specify a subsequent video frame. If the second verification result indicates that verification fails, it is indicated that the management instructions in the content control information are inconsistent with the attribute of the decryption terminal itself. Therefore, the decryption terminal cannot decrypt the encrypted content ciphertext, so it is necessary to exit the decryption process.

The interface data transmission method has the following beneficial effects. By acquiring encrypted content stream data sent by an encryption terminal, the encrypted content stream data including a content stream key, content control information in a content control information list and encrypted stream ciphertext; extracting the content control information and the content stream key in the content control information list from the encrypted content stream data, parsing the content control information and the content stream key by means of the shared key, and verifying integrity to obtain a first verification result; performing verification according to the content control information to obtain a second verification result if the first verification result indicates that verification passes; and storing the content control information based on the second verification result, and decrypting the encrypted stream ciphertext according to the content control information, multi-stream transmission of interface data can be flexibly managed, the time consumed can be reduced, and high fault tolerance can be achieved.

In some embodiments of the disclosure, the storing the content control information based on the second verification result and decrypting the encrypted stream ciphertext according to the content control information includes the following steps.

Storing the content control information if the second verification result indicates that verification passes. Optionally, if and only if the second verification result indicates that verification passes, it can be determined that the management instructions in the content control information are consistent with the attribute of the decryption terminal itself, so the decryption terminal can decrypt the encrypted content stream data. Therefore, when the second verification result indicates that verification passes, the content control information may be stored, the content control information is used to decrypt the encrypted content stream data.

Extracting a preset infoFrame and a preset active pixel from the encrypted stream ciphertext according to the content control information. Optionally, the preset infoFrame may include FrameNumber (the serial number of the encrypted initial video frame) specified in the encrypted stream ciphertext and InfoFrameTypeCodeList (indicating which infoFrames are encrypted in the video format, that is, encrypted infoFrames are specified) in the subsequent video frame, and the preset active pixel may include data in the range of EncryptArea (the horizontal-vertical value of the encrypted active pixel area of the video format frame). FrameNumber, InfoFrameTypeCodeList and EncryptArea may be obtained by negotiation between the encryption terminal and the decryption terminal. Specifically, assuming that in the encrypted stream ciphertext, the positioning infoFrameNumber is 0, it is indicated that both the current video frame and the subsequent video frame in the content control information need to be encrypted. Assuming that in the CTA-861-G, an audio infoFrame is defined as InfoFrame Type=0x04, the preset infoFrame may be obtained as InfoFrameTypeCodeList; and assuming that the horizontal-vertical value of the encrypted active pixel area of the video format frame is {{250,340}, {350,700}}, the preset active pixel EncryptArea may be obtained.

Decrypting the preset infoFrame and the preset active pixel according to the content stream key. Optionally, assuming that the preset infoFrame is InfoFrameType-CodeList, the preset active pixel is EncryptArea, and the FrameNumber is 0, then the InfoFrameTypeCodeList and the data in the range of EncryptArea in the FrameNumberth video frame specified in the encrypted stream ciphertext and the subsequent video frame can be decrypted according to the content stream key Kc and the initial value IV to obtain a decrypted content stream. If the second verification result indicates that verification passes, the content control information may be stored, a preset infoFrame and a preset active pixel may be extracted from the content control information, and the encrypted content stream data can be decrypted according to the preset infoFrame and the preset active pixel, so that the content stream sent by the encryption terminal can be quickly decrypted and the security of the decryption process can be ensured.

In some embodiments of the disclosure, the extracting the content control information and the content stream key in the content control information list from the encrypted content stream data includes the following steps.

Demultiplexing a target infoFrame in the encrypted content stream data to obtain the content control information list. Optionally, if the encryption terminal utilizes target infoFrame multiplexing, a target infoFrame is demultiplexed to separate a ctr value of the target infoFrame and a content control information list Key_CCI_InfoList in a data field. When there are multiple target infoFrames in the encrypted content stream data, only one target infoFrame needs to be randomly selected for demultiplexing to obtain the Key_CCI_InfoList.

Extracting the content control information and the content stream key from the content control information list. Optionally, since the content control information list may contain content control information and content stream key, after demultiplexing the target infoFrame and separating the ctr value of the target infoFrame and the content control information list Key_CCI_InfoList in the data field, the content control information, the content stream key Kc and the initial value IV may be extracted from the content control information list Key_CCI_InfoList. By demultiplexing the target infoFrame in the encrypted content stream data, extracting the content control information list, and extracting the content control information and the content stream key from the content control information list if the encryption terminal utilizes special infoFrame multiplexing, the time consumed for decryption can be reduced and the decryption efficiency can be improved.

In some embodiments of the disclosure, the extracting the content stream key and the content control information in the content control information list from the encrypted content stream data further includes:

Identifying control link symbols from a target link in the encrypted content stream data, where the control link symbols may be Control Link Symbols defined by the interface link layer in the target link, and the control link symbols may be set according to requirements. Optionally, if the encryption terminal utilizes interface link multiplexing, a special packet of the control link symbols of the target link in the encrypted content stream data may be identified, that is, the control link symbols may be obtained.

Parsing the control link symbols to obtain the content control information list, and extracting the content control information and the content stream key from the content control information list. Optionally, the encrypted content stream data may be parsed according to the identified special packet of the control link symbols to obtain the content control information list Key_CCI_InfoList and the encryption counter value ctr, and then the content control information and the content stream key Kc as well as the initial value IV may be extracted from the content control information list Key_CCI_InfoList. By identifying the control link symbols according to the target link in the encrypted content stream data, and then parsing the content control information and the content stream key according to the control link symbols, the time consumed by decryption can be reduced and the decryption efficiency can be improved.

An interface data transmission method according to an embodiment in a third aspect of the disclosure, applied to an encryption terminal and a decryption terminal, includes:

performing, by the encryption terminal, the interface data transmission method according to the embodiment in the first aspect of the disclosure; correspondingly, performing, by the decryption terminal, the interface data transmission method according to the embodiment in the second aspect of the disclosure.

The interface data transmission method has the following beneficial effects. By performing the interface data transmission method according to the embodiment in the first aspect of the disclosure by the encryption terminal, and by performing the interface data transmission method according to the embodiment in the second aspect of the disclosure by the decryption terminal, multi-stream transmission of interface data can be flexibly managed, the time consumed can be reduced, and high fault tolerance can be achieved.

The process of the interface data transmission method according to the embodiment of the disclosure is described in detail below with a specific embodiment. It should be understood that the following detailed description is merely exemplary, and is not a specific limitation to the disclosure.

An interface data transmission method, applied to an encryption terminal and a decryption terminal, where the encryption terminal performs following steps.

In a first step, an encryption key of a content stream is generated.

When the encryption terminal needs to send the content stream to one or more decryption terminals, an encryption process of the encryption terminal is started. A stream key Kc of the content stream and an initial value IV may be generated randomly. For example, the key of the AES-128-CTR algorithm is a 128-bit random number, and the initial value IV is a 64-bit random number. Thus, the content stream key Kc and the initial value IV may be obtained.

In a second step, the content stream is encrypted by means of the content stream key to form encrypted stream ciphertext.

A key pipeline may be prepared according to the content stream key Kc and the initial value IV, and the content stream may be encrypted by means of the content stream key Kc and the initial value IV to obtain the encrypted stream ciphertext. The encryption range of the content stream may include the encryption of effective pixels in a video frame format, and may also include the encryption of data of specified infoFrames in the video frame format. The encryption range of the content stream may specify a currently processed video frame, and may also specify a subsequent video frame, to obtain the encrypted stream ciphertext.

In a third step, it is judged whether the decryption terminal meets the requirements of licensing instructions, and for a decryption terminal that meets the requirements, the content control information and the content stream key are encrypted by means of the shared key.

It may be checked whether one or more decryption terminals meet the requirements of the content control information of the encryption terminal. Specifically, the content control information such as Depth, SecurityLevel and Version of the decryption terminal may be checked, and a unique identifier ID of the decryption terminal that meet the requirements of Depth, SecurityLevel and Version may be extracted. If multiple decryption terminals meet the requirements, an ID List may be generated according to the IDs of the multiple decryption terminals.

In a fourth step, a shared key Ks of the decryption terminal is checked out through the ID list, the shared key comes from the authentication negotiation between a content stream encryption terminal and a content stream decryption terminal. When there are multiple decryption terminals, there are multiple different Ks, a Ks list is formed. Then, a key and control information list Key_CCI_InfoList are generated through the Ks list as follows:

Key_CCI_InfoList=CCI||List{ID_B||EKs||
    HMAC(Ks, CCI||ID_B||EKs)} where List is a list that may contain multiple keys and control information, EKs=AES-128-CTR (KS, Kc||IV), Ks is the shared key of the encryption terminal and the decryption terminal, Kc is the content stream key, and IV is the initial value of content stream encryption. HMAC is an HMAC-SHA256 algorithm, which is used to protect the integrity of messages.

CCI={Depth, SecurityLevel, Version, FrameNumber||InfoFrameTypeCodeList||EncryptArea} where FrameNumber is the serial number of the preset encrypted initial video frame, for example, FrameNumber is 0; InfoFrameTypeCodeList indicates which infoFrames are encrypted in the video format. For example, in the CTA-861-G, an audio infoFrame is defined as InfoFrame Type=0x04. If the InfoFrameTypeCodeList contains 0x04 type, the data of the audio infoFrames are encrypted. EncryptArea is the horizontal-vertical value of the encrypted active pixel area of the video format frame, such as {{250, 340}, {350,700}}, that is, the active pixel blocks of horizontal 250 to 350 and vertical 340 to 700 are encrypted. Depth is the number of times by which the stream is decrypted, SecurityLevel is the security level of the decryption terminal, and Version is the version of the decryption terminal. These values are set by the authority control, and are used to mark that the content stream of the encryption terminal is allowed to be decrypted by the device with what security requirements. FrameNumber, InfoFrameTypeCodeList and EncryptArea may all be obtained through negotiation between the encryption terminal and the decryption terminal. ID_B is the unique identifier of the decryption terminal.

In a fifth step, it is checked whether the preparation of a key pipeline is completed, if not, wait until the preparation of the key pipeline is completed; if so, for the data the data specified by EncryptArea in the FrameNumberth video frame and the subsequent video frame, the data in the video format frame in the encrypted stream ciphertext obtained in the second step is encrypted by means of the AES-128-ctr algorithm based on the Kc and IV and the packet counter value ctr, to obtain encrypted content control information.

In a sixth step, in order to enhance fault tolerance, the encrypted content stream key and the content control information list may be multiplexed for many times. If a special infoFrame is adopted for multiplexing, the sixth step S6 continued; and if an interface link is adopted for multiplexing, the seventh step is executed.

(1) For the method of multiplexing using the special infoFrame, the special infoFrame may be defined, and the format is shown in Table 2 below:

TABLE 2

| Extended InfoFrame Type code(2 bytes) | Type LSB |
| --- | --- |
| | Type MSB |
| Length of Extended InfoFrame (2 bytes) | Length LSB |
| | Length MSB |
| Ctr (8 bytes) | ctr value of AES-128-ctr encryption, corresponding to the ctr value of the initial packet of the encryption area |
| Data Byte 1 | Extended InfoFrame Data Byte 1 |
| ... | ... |
| Data Byte n | Extended InfoFrame Data Byte n |

Referring to FIG. 2, the content of the content control information list Key_CCI_InfoList may be multiplexed for many times and then filled into a data segment (Data byte) of the infoFrame. The Key_CCI_InfoList does not need to be multiplexed for all video frames. Generally, when the content stream key Kc is generated, the content stream key Kc is updated, the CCI is generated, and the CCI is updated, it is only necessary to multiplex the special infoFrame in several initial video format frames, to save bandwidth consumption.

The filled infoFrame may be embedded in the encrypted stream ciphertext. The encrypted content control information list is defined as a special infoFrame placed in the vertical blanking area of the video format of the encrypted stream ciphertext, and before any encrypted infoFrame, the embedding effect is shown in FIG. 2, thereby generating encrypted content stream data.

In a seventh step, the content control information list Key_CCI_InfoList is inserted into the Control Link Symbols defined by the interface link layer. For example, the Key_CCI_InfoList and the ctr are packaged into a packet and the packet is inserted between SS and SE in DP1.4, as shown in FIG. 3. When the content stream key Kc is generated, the content stream key Kc is updated, the CCI is generated, and the CCI is updated, the CCI may be multiplexed and transmitted several times by means of the interface link. The inserted interface link may be embedded into the encrypted stream ciphertext. Specifically, the encrypted content control information list is defined as a special packet transmitted by an interface, and the special packet is marked by an interface link symbol and transmitted, so that the encrypted content stream data can be generated.

The decryption terminal executes the following steps.

In a first step, a content stream key and a content control information list are separated from an encrypted content stream.

After the decryption terminal receives the content stream, a decryption process of the decryption terminal is started. It may be checked whether the current encrypted content stream data contains a content stream key Kc and a content control information list Key_CCI_InfoList, if not, it is searched whether the current content stream key Kc exists at present, if Kc does not exist, wait until the key_CCI_Infolist appears in the encrypted content stream data; and if the Key_CCI_InfoList does not exist, but Kc exists, the encrypted stream ciphertext in the encrypted content stream data is directly decrypted. Before decrypting any infoFrame of the encrypted stream ciphertext, a content stream key and a special infoFrame of the content control information list are separated from a vertical blanking area; or before decrypting any video frame in a video format, a content stream key and a control information special packet corresponding to the content control information list are separated from interface link symbols.

In a second step, the content control information list and the content stream key are decrypted.

When there is a Key_CCI_InfoList, the Key_CCI_InfoList and an encryption counter value ctr are obtained by demultiplexing. If the encryption terminal utilizes infoFrame multiplexing, a special infoFrame in the encrypted content stream data is demultiplexed to separate a ctr value of the infoFrame and a content control information list Key_CCI_InfoList in a data field. When there are multiple special infoFrames, only one infoFrame needs to be randomly selected for demultiplexing. If the encryption terminal utilizes interface link multiplexing, a special packet of the control link symbols is identified, and the Key_CCI_InfoList and the encryption counter value ctr are obtained by parsing.

A unique ID of the decryption terminal is searched for and compared with ID_B in the content control information list Key_CCI_InfoList, to judge whether the two are consistent, if so, the content control information in the content control information list and the content stream key Kc are extracted, and an HMAC value is verified or is verified through the CMAC to verify the integrity of the content control information and the content stream key. For example, Kc and IV may be decrypted by means of the shared key Ks, and the content control information may be extracted. If the content control information consistent with the unique ID_B is not found, an error is reported, and the decryption process is exited.

It may be verified whether the management instructions in the content control information are consistent with an attribute of the decryption terminal itself, for example, it may be checked whether the Depth, SecurityLevel and Version of the decryption terminal itself are consistent with the Depth, SecurityLevel and Version in the management instructions, if not, the decryption process is exited. If the management instructions are consistent with the attribute of the decryption terminal itself, the content control information is stored. Meanwhile, the key pipeline may be prepared according to Kc, IV and ctr.

In a third step, the encrypted content stream data is decrypted by means of the content stream key and the content control information.

It may be checked whether the preparation of a key pipeline is completed, if not, wait until the preparation of the key pipeline is completed; if so, the InfoFrameTypeCodeList and the data in the range of EncryptArea in the FrameNumber$^{th}$ video frame specified in the encrypted stream ciphertext and the subsequent video frame are decrypted. The decryption range of the encrypted stream ciphertext may include the decryption of effective pixels in a video frame format, and may also include the decryption of data of specified infoFrames in the video frame format. The decryption range of the encrypted stream ciphertext may specify a currently processed video frame, or may also specify a subsequent video frame. When a new video frame stream comes, the firth step of the decryption terminal is repeatedly executed.

The interface data transmission method has the following beneficial effects. By performing the interface data transmission method according to the embodiment in the first aspect of the disclosure by the encryption terminal, and by performing the interface data transmission method according to the embodiment in the second aspect of the disclosure by the decryption terminal, multi-stream transmission of interface data can be flexibly managed, the time consumed can be reduced, and high fault tolerance can be achieved.

Figure 5:
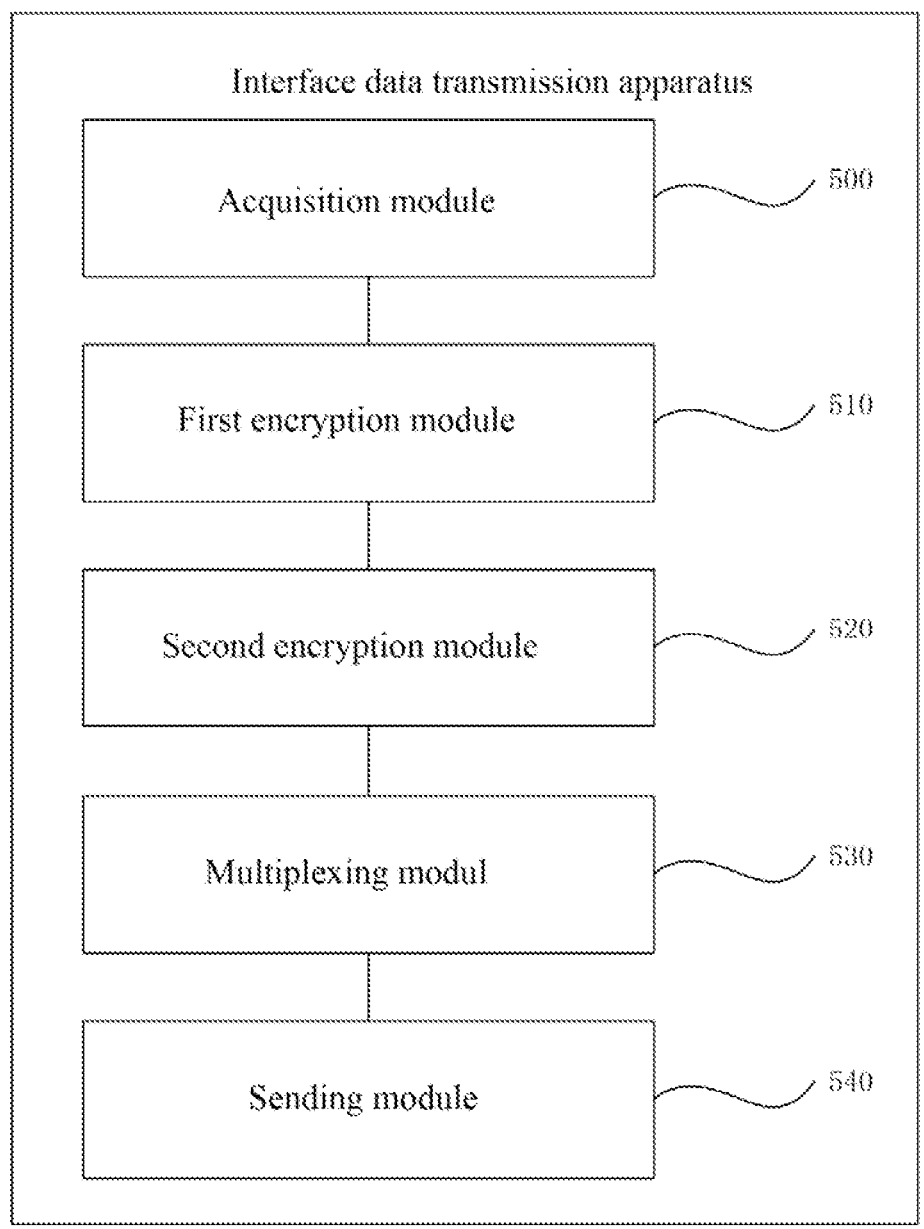
FIG. 5 is a schematic structural diagram of an interface data transmission apparatus according to an embodiment of the disclosure.

Referring to FIG. 5, an interface data transmission apparatus according to an embodiment in a fourth aspect of the disclosure, includes:
- an acquisition module 500 configured to acquire a target content stream and a content stream key corresponding to the target content stream;
- a first encryption module 510 configured to encrypt the target content stream according to the content stream key to obtain encrypted stream ciphertext;
- a second encryption module 520 configured to acquire content control information and a shared key of a decryption terminal, and encrypt the content stream key and the content control information according to the shared key to generate a content control information list;
- a multiplexing module 530 configured to embed the content control information list into the encrypted stream ciphertext to generate encrypted content stream data; and
- a sending module 540 configured to send the encrypted content stream data to the decryption terminal.

The interface data transmission apparatus has the following beneficial effects. By performing the interface data transmission method according to the embodiment in the first aspect of the disclosure, multi-stream transmission of interface data can be flexibly managed, the time consumed can be reduced, and high fault tolerance can be achieved.

Figure 6:
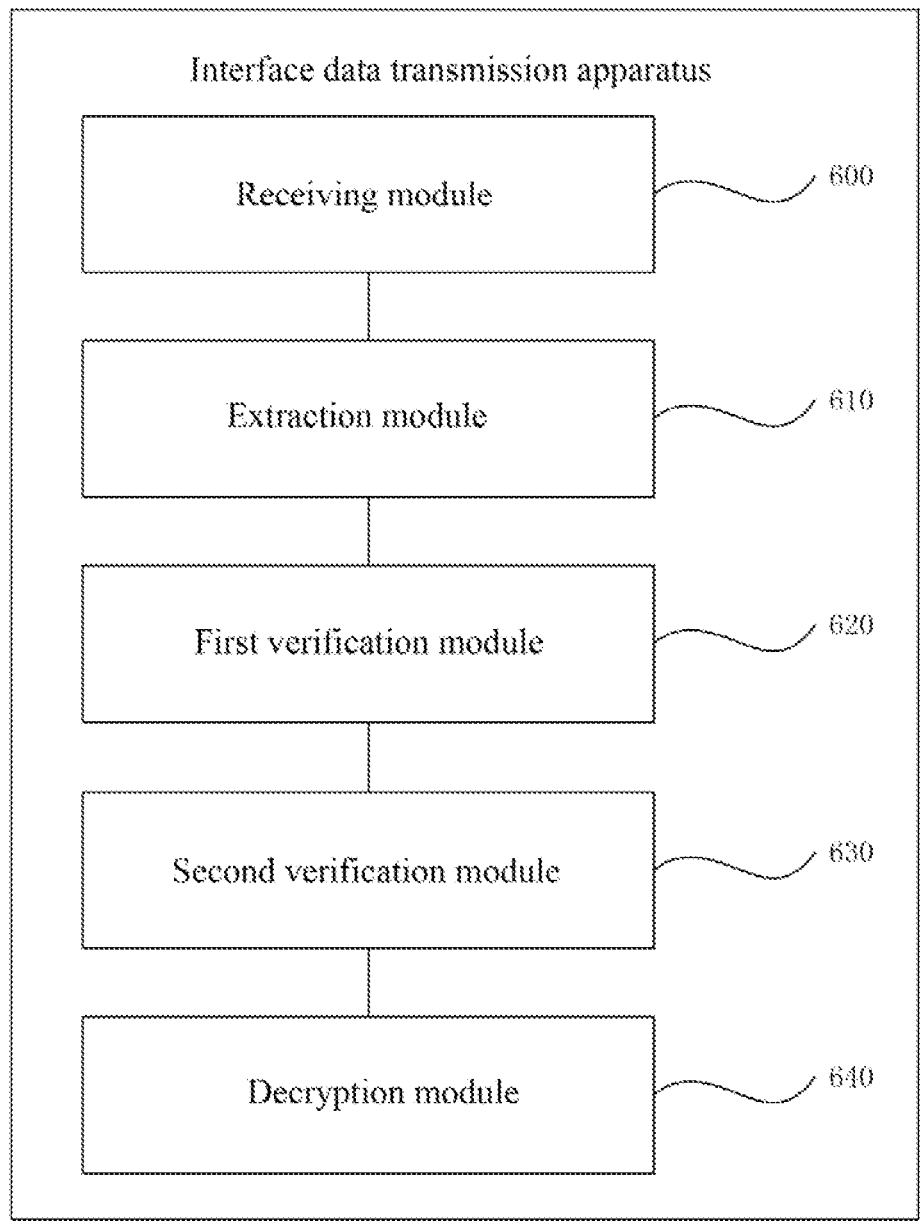
FIG. 6 is a schematic structural diagram of an interface data transmission apparatus according to another embodiment of the disclosure.

Referring to FIG. 6, an interface data transmission apparatus according to an embodiment in a fifth aspect of the disclosure, includes:

- a receiving module 600 configured to acquire encrypted content stream data sent by an encryption terminal, the encrypted content stream data comprising a content control information list and encrypted stream ciphertext;
- an extraction module 610 configured to extract content control information and a content stream key in the content control information list from the encrypted content stream data;
- a first verification module 620 configured to parse the content control information and the content stream key by means of the shared key, and verify integrity to obtain a first verification result;
- a second verification module 630 configured to perform verification according to the content control information to obtain a second verification result if the first verification result indicates that verification passes; and
- a decryption module 640 configured to store the content control information based on the second verification result, and decrypt the encrypted stream ciphertext according to the content control information.

The above-mentioned interface data transmission apparatus has the following beneficial effects. By performing the interface data transmission method according to the embodiment in the second aspect of the disclosure, multi-stream transmission of interface data can be flexibly managed, the time consumed can be reduced, and high fault tolerance can be achieved.

Figure 7:
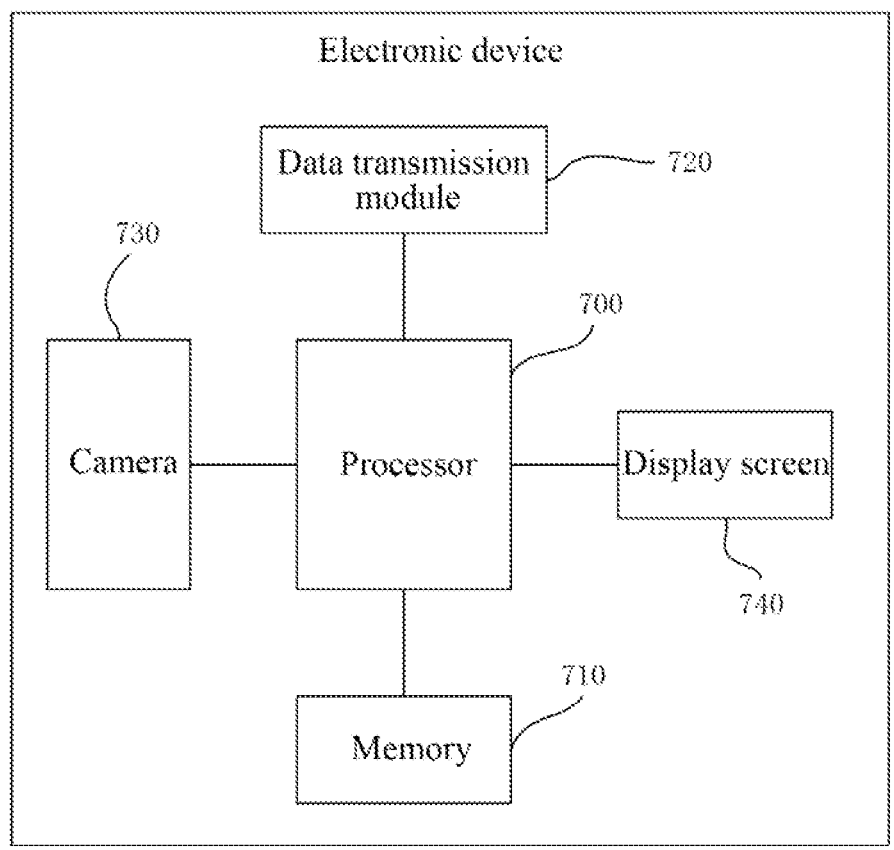
FIG. 7 is a functional block diagram of an electronic device according to an embodiment of the disclosure.

Referring to FIG. 7, an electronic device according to an embodiment in a sixth aspect of the disclosure, includes:

- at least one processor 700 and a memory 710 in communicative connection with the at least one processor 700; and may further include a data transmission module 720, a camera 730 and a display screen 740.

By calling a computer program stored in the memory 710, the processor 700 is configured to perform the interface data transmission method according to the embodiment in the first aspect of the disclosure, or the interface data transmission method according to the embodiment in the second aspect of the disclosure, or the interface data transmission method according to the embodiment in the third aspect of the disclosure.

As a non-transient storage medium, the memory may be configured to store non-transient software program and non-transient computer-executable programs, such as the interface data transmission method according to the embodiment in the first aspect of the disclosure and/or the interface data transmission method according to the embodiment in the second aspect of the disclosure and/or the interface data transmission method according to the embodiment in the third aspect of the disclosure. The processor, when executing the non-transient software program and instructions stored in the memory, implements the interface data transmission method according to the embodiment in the first aspect and/or the interface data transmission method according to the embodiment in the second aspect and/or the interface data transmission method according to the embodiment in the third aspect.

The memory may include a program storage area and a data storage area, where the program storage area may store an operating system, and an application program required by at least one function; and the data storage area may store data for performing the interface data transmission method according to the embodiment in the first aspect and/or the interface data transmission method according to the embodiment in the second aspect and/or the interface data transmission method according to the embodiment in the third aspect. In addition, the memory may include a high-speed random access memory, and may also include a non-transient memory, such as at least one magnetic disk storage device, a flash memory device, or other non-transient solid state storage device. In some implementations, the memory may include memories remotely located with respect to the processor, and these remote memories may be connected to the processor through networks. Examples of the above networks include, but are not limited to, the Internet, intranet, local area network, mobile communication network and combinations thereof.

The non-transient software program and instructions required to implement the interface data transmission method according to the embodiment in the first aspect and/or the interface data transmission method according to the embodiment in the second aspect and/or the interface data transmission method according to the embodiment in the third aspect are stored in the memory, and when executed by one or more processors, cause the one or more processors to perform the interface data transmission method according to the embodiment in the first aspect and/or the interface data transmission method according to the embodiment in the second aspect and/or the interface data transmission method according to the embodiment in the third aspect. By means of the electronic device, the number of rounds of interface authentication can be reduced, the authentication process can be simplified, and the authentication efficiency can be significantly improved.

A computer-readable storage medium is provided according to an embodiment in a seventh aspect of the disclosure, which stores computer-executable instructions, where the computer-executable instructions are used to perform the interface data transmission method according to the embodiment in the first aspect of the disclosure, or perform the interface data transmission method according to the embodiment in the second aspect of the disclosure, or perform the interface data transmission method according to the embodiment in the third aspect of the disclosure.

In some embodiments, the storage medium stores computer-executable instructions, where the computer-executable instructions, when executed by one or more control processors, for example, by one processor in the electronic device according to the embodiment in the sixth aspect, may cause the one or more processors to perform the interface data transmission method according to the embodiment in the first aspect and/or the interface data transmission method according to the embodiment in the second aspect and/or the interface data transmission method according to the embodiment in the third aspect.

The embodiments of the disclosure are described in detail with reference to the drawings, but the disclosure is not limited to the above embodiments, and various changes can be made within the knowledge of those having ordinary skill in the art without departing from the purpose of the disclosure.

The device embodiments described above are merely illustrative, and the units described as separate components may or may not be physically separated, that is, may be located in one place, or may be distributed onto multiple network elements. Some or all of the modules may be selected according to actual needs to achieve the purpose of this embodiment.

Those having ordinary skill in the art can understand that all or some of the steps in the methods, and systems disclosed above may be implemented as software, firmware, hardware and appropriate combinations thereof. Some or all of the physical components may be implemented as software executed by a processor, such as a central processing unit, a digital signal processor or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). As is well known to those having ordinary skill in the art, the term computer storage medium includes volatile and nonvolatile, removable and non-removable medium implemented in any method or technology for storing information such as computer readable instructions, data structures, program modules or other data. The computer storage medium may include RAM, ROM, EEPROM, flash memory or other memory technologies, CD-ROM, digital versatile disk (DVD) or other optical disk storage, magnetic cassette, magnetic tape, magnetic disk storage or other magnetic storage devices, or any other medium that can be used to store desired information and can be accessed by a computer. In addition, it is well known to those having ordinary skill in the art that the communication medium may generally include computer readable instructions, data structures, program modules or other data in a modulated data signal such as a carrier wave or other transmission mechanism, and may include any information delivery medium.

In the description of this specification, description with reference to the terms "one embodiment", "some embodiments", "illustrative embodiments", "examples", "specific examples" or "some examples" means that the specific features, structures, materials or characteristics described in connection with that embodiment or example is included in at least one embodiment or example of the disclosure. In this specification, the schematic expressions of the above terms do not necessarily refer to the same embodiment or example. Furthermore, the specific features, structures, materials or characteristics described may be combined in any one or more embodiments or examples in a suitable manner.

Although the embodiments of the disclosure have been shown and described, those having ordinary skill in the art can understand that many changes, modifications, replacements and variations can be made to these embodiments without departing from the principles and purposes of the disclosure, and the scope of disclosure is defined by the claims and their equivalents.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An interface data transmission method, comprising:
   acquiring a target content stream and a content stream key corresponding to the target content stream;
   encrypting the target content stream according to the content stream key to obtain encrypted stream ciphertext;
   acquiring content control information and a shared key of a decryption terminal, and encrypting the content stream key and the content control information according to the shared key to generate a content control information list;
   embedding the content control information list into the encrypted stream ciphertext to generate encrypted content stream data, which further comprises:
      defining an initial infoFrame;
      filling the content control information list into the initial infoFrame to obtain a target infoFrame; and
      embedding the target infoFrame into the encrypted stream ciphertext to generate the encrypted content stream data; and
   sending the encrypted content stream data to the decryption terminal.

2. The method of claim 1, wherein the acquiring content control information and a shared key of a decryption terminal, and encrypting the content stream key and the content control information according to the shared key to generate a content control information list comprises:
   acquiring content control information of the decryption terminal;
   extracting a decryption identifier of the decryption terminal from the content control information;
   obtaining the shared key according to the decryption identifier, and encrypting the content stream key according to the shared key; and
   generating the content control information list according to the shared key, the encrypted content stream key and the content control information.

3. The method of claim 1, further comprising:
   inserting the content control information list into a preset link to obtain a target link; and
   embedding the encrypted stream ciphertext into the target link to generate the encrypted content stream data.

4. An interface data transmission method, comprising:
   acquiring encrypted content stream data sent by an encryption terminal, the encrypted content stream data comprising a content control information list and encrypted stream ciphertext;
   wherein the encryption terminal embodies the content control information list into the encrypted stream ciphertext to generate the encrypted content stream data;
      wherein embedding the content control information list into the encrypted stream ciphertext to generate encrypted content stream data comprises:
         defining an initial infoFrame;
         filling the content control information list into the initial infoFrame to obtain a target infoFrame; and
         embedding the target infoFrame into the encrypted stream ciphertext to generate the encrypted content stream data; and
   extracting content control information and a content stream key in the content control information list from the encrypted content stream data;
   parsing the content control information and the content stream key by means of the shared key, and verifying integrity to obtain a first verification result;
   performing verification according to the content control information to obtain a second verification result in response to the first verification result indicating that verification passes; and
   storing the content control information based on the second verification result, and decrypting the encrypted stream ciphertext according to the content control information.

5. The method of claim 4, wherein the storing the content control information based on the second verification result, and decrypting the encrypted stream ciphertext according to the content control information comprises:

storing the content control information in response to the second verification result indicating that verification passes;

extracting a preset infoFrame and a preset active pixel from the encrypted stream ciphertext according to the content control information; and decrypting the preset infoFrame and the preset active pixel according to the content stream key.

6. The method of claim 4, wherein the extracting content control information and a content stream key in the content control information list from the encrypted content stream data comprises:

demultiplexing a target infoFrame in the encrypted content stream data to obtain the content control information list; and extracting the content control information and the content stream key from the content control information list.

7. The method of claim 6, further comprising:

identifying control link symbols from a target link in the encrypted content stream data; and parsing the control link symbols to obtain the content control information list, and extracting the content control information and the content stream key from the content control information list.

8. An electronic device, comprising: a memory, a processor, and a computer program stored in the memory and runnable on the processor, wherein when executing the program, the processor implements the interface data transmission method of claim 1.

9. A non-transitory computer-readable storage medium, storing computer-executable instructions, wherein the computer-executable instructions are used to perform the interface data transmission method of claim 1.

10. An electronic device, comprising: a memory, a processor, and a computer program stored in the memory and runnable on the processor, wherein when executing the program, the processor implements the interface data transmission method of claim 4.

11. A non-transitory computer-readable storage medium, storing computer-executable instructions, wherein the computer-executable instructions are used to perform the interface data transmission method of claim 4.

* * * * *